2 Sheets—Sheet 1.

J. E. SMITH.
Meat-Cutter.

No. 208,859. Patented Oct. 8, 1878.

Witnesses.
Chas. J. Buchheit
Edward J. Brady

J. E. Smith, Inventor.
By Wilhelm & Bonner
Attorneys.

2 Sheets—Sheet 2.

J. E. SMITH.
Meat-Cutter.

No. 208,859. Patented Oct. 8, 1878.

Chas. J. Buchheit,
Edward J. Brady
Witnesses.

J. E. Smith, Inventor,
By Wilhelm & Bonner
Attorneys.

N. PETERS, PHOTO-LITHOGRAPHER, WASHINGTON, D. C.

UNITED STATES PATENT OFFICE.

JOHN E. SMITH, OF BUFFALO, NEW YORK.

IMPROVEMENT IN MEAT-CUTTERS.

Specification forming part of Letters Patent No. 208,859, dated October 8, 1878; application filed July 30, 1878.

*To all whom it may concern:*

Be it known that I, JOHN E. SMITH, of Buffalo, in the county of Erie and State of New York, have invented a new and useful Improvement in Meat-Cutters, of which the following is a specification, reference being had to the accompanying drawing.

My invention relates more especially to that class of meat-cutters which are provided with a rotating circular table upon which the meat is cut by means of vertically-reciprocating knives.

My invention consists of a rotating stirrer or agitator, arranged above the cutting-table so as to turn over and mix the meat while it is being cut, thereby continuously changing the relative position of the pieces of meat, and presenting all parts thereof to the action of the cutters, as will be hereinafter more fully set forth.

Figure 1:
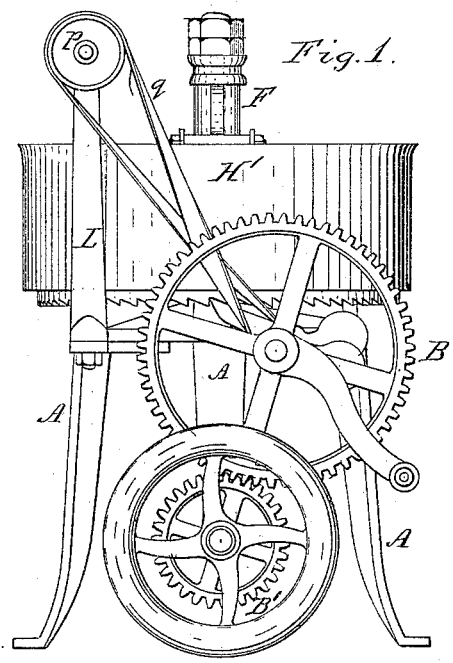
Figure 2:
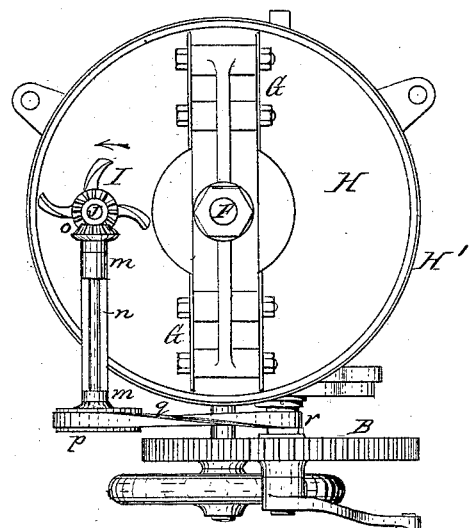
Figure 3:
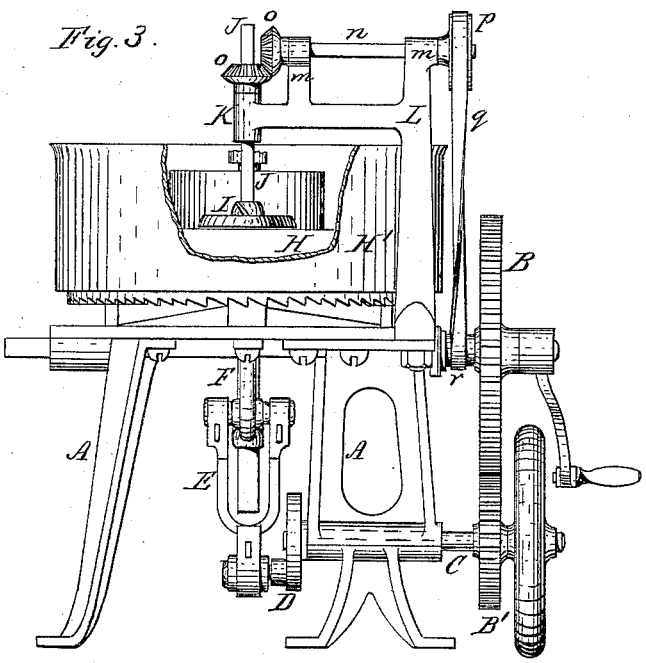
Figure 4:
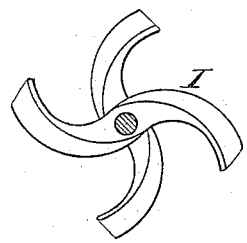
Figure 5:

In the accompanying drawings, Figure 1 is an elevation of a meat-cutting machine provided with my improvements. Fig. 2 is a top-plan view thereof. Fig. 3 is an elevation at right angles to Fig. 1, with a portion of the curb of the table broken away. Fig. 4 is a detached plan view of the rotating stirrer. Fig. 5 is a detached plan view of a modified form thereof.

Like letters of reference refer to like parts in the several figures.

A is the frame of the machine; B B', the driving-gear; C, the counter-shaft; D, the crank; E, the connecting-rod; F, the vertical reciprocating cutter-rod; G, the cutters; H, the rotating cutting block or table, and H' the curb thereof, all constructed in the ordinary and well-known manner.

I is the rotating stirrer, mixer, or agitator, arranged above the table H, so as to turn over and mix the meat as it passes from one cutter to the other. The stirrer I is composed of one or more curved or straight arms, beveled in the direction of their motion, and secured to the lower end of a vertical shaft, J, which is supported in a bearing, K, formed at the end of the horizontal arm of frame L. The latter is secured to the main frame A, and provided with two horizontal bearings, $m$ $m$, in which is supported a horizontal shaft, $n$, connected with the vertical shaft J by two bevel-wheels, $o$ $o$. $p$ is a pulley secured to the outer end of the shaft $n$, and $q$ an endless belt passing over the pulley $p$ and a pulley, $r$, secured to the driving-wheel B. Upon applying power to the latter the machine is operated and the stirrer I rotated in the direction of the arrow, Fig. 2, whereby the meat is thoroughly mixed, turned over, and moved from the outer portion of the table to the inner, and vice versa, as it passes from one cutter G to the other, thereby presenting all parts of the meat to the action of the cutters, and insuring a complete and uniform comminution of the meat.

The services of an attendant for the purpose of turning over the meat are dispensed with by my improved device, and the machine can therefore be operated at less expense.

It is obvious that the stirrer I can be operated by different mechanism from that described, and that the form of the stirrer-blade may be varied; but I prefer the construction herein shown and described.

I claim as my invention—

1. The combination, with the rotating table H and reciprocating cutters G, of the independently-rotating stirrer I, substantially as and for the purpose set forth.

2. The combination, with the main frame A and rotating table H, of the frame L, shafts $n$ J, bevel-wheels $o$, driving-belt $q$, and stirrer I, substantially as set forth.

JOHN E. SMITH.

Witnesses:
 EDWARD WILHELM,
 JNO. J. BONNER.